Nov. 11, 1930. J. E. TROUTH 1,781,255
CEMENT MIXER FOR CEMENTING OIL AND GAS WELLS
Filed April 24, 1929
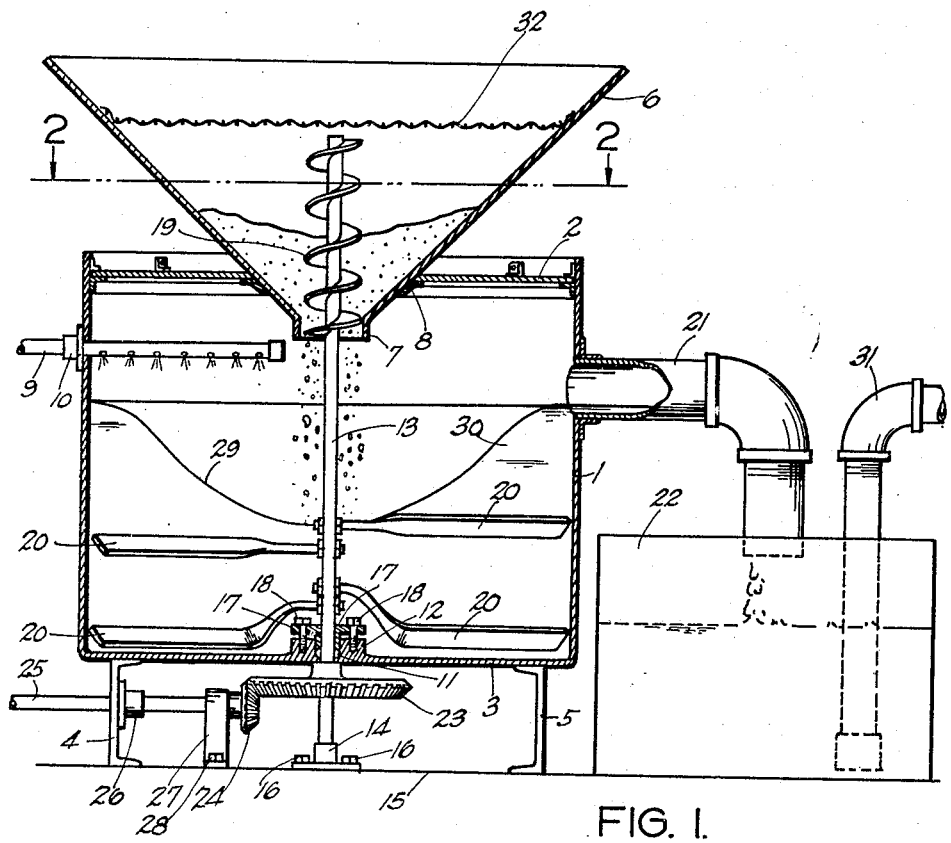
FIG. I.
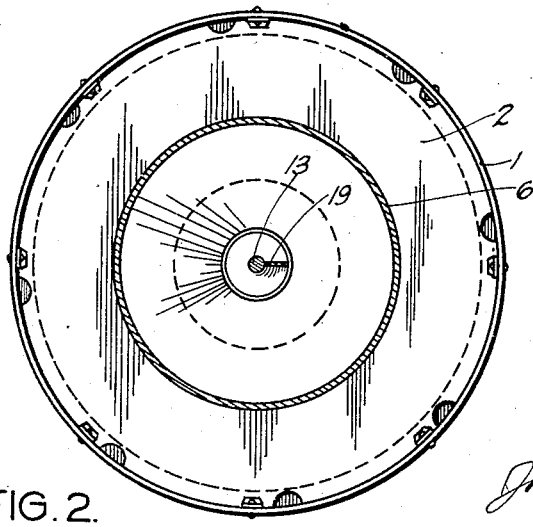
FIG. 2.
INVENTOR
John E. Trouth
BY Loyal J. Miller
ATTORNEY Patented Nov. 11, 1930

1,781,255

UNITED STATES PATENT OFFICE

JOHN E. TROUTH, OF SEMINOLE, OKLAHOMA, ASSIGNOR TO INDEPENDENT OIL WELL CEMENTING CO., INC., OF OKLAHOMA CITY, OKLAHOMA

CEMENT MIXER FOR CEMENTING OIL AND GAS WELLS

Application filed April 24, 1929. Serial No. 357,675.

My invention relates to cement mixers for mixing cement for cementing oil and gas wells.

The objects of my invention are to produce a device of this class which will be new, novel, practical and of utility; which will automatically control the feeding of the dry cement thereinto; which will mix cement and water to the same desired consistency at all times after it has once been properly adjusted; which will be economical in operation; which will be cheaply constructed; which will be durable; which will thoroughly mix the cement and water; which will be efficient in accomplishing all of the purposes for which it is intended.

There is a mixer recently becoming of general use for mixing cement for cementing oil and gas wells. This mixer uses as its mixing agent a powerful stream of water. There is no means provided for controlling the feeding of the dry cement and for this reason it requires an attendant to do the feeding by hand. This results in a mixture which is not uniform at all times.

There are various other methods of mixing cement and water for this purpose but to my knowledge there are none being used which automatically control the amount of cement used.

My invention overcomes the impracticabilities of the present methods as well as embodying new and novel features of its own.

With these and other objects in view as will more fully appear my invention consists in the construction, novel features, and combination of parts hereinafter more fully described, pointed out in the claims hereto appended, and illustrated in the accompanying one-sheet drawing, of which, Figure 1 is an elevational view showing the mixer in section with relation to the cement pan; Fig. 2 is a top view of the funnel of the mixer.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

A practical embodiment of the invention as illustrated in the drawings includes:

A hollow cylindrical metal drum 1 with flat annular top 2 and flat bottom 3. Said drum 1 is rigidly mounted upon channel irons 4 and 5 or any desirable base which will provide space beneath said drum for the geared drive which is more fully described below. I provide a funnel shaped bin 6 upon and extending above the central portion of said top 2. Said bin 6 has its neck portion 7 extending downward through said top 2 into the interior of said drum 1. Said bin 6 is rigidly attached upon said top 2 by an annular shaped angle iron 8 or by any desired or known means. Across said funnel 6 adjacent its top portion is provided screen 32 for screening the dry cement before its use in the mixer. Extending through one side of said drum 1 at a point adjacent the top thereof, and with its inward extending end reaching a point adjacent said downward extending neck 7, I provide water supply line 9. Said line 9 is closed at its free end and is provided along its bottom side with a plurality of perforations $9^a$ for allowing the passage of the water into said drum 1. Said line 9 is positioned by a flanged collar 10 or by other suitable means. Said drum 1 is further provided at the upper portion of the side thereof opposite from the side through which said water line 9 is positioned, with discharge pipe 21 which leads to and discharges into a cement pan 22. Through the central portion of said bottom 3 and in axial alinement with the center of the orifice of said neck 7 is perforation 11. Surrounding said perforation 11 is an upward extending flange 12.

I provide perpendicular shaft 13 extending upward through said perforation 11 and through the interior of said drum 1 and through said neck 7 to any desired point within said funnel 6. Said shaft 13 is operatively supported at its bottom end by a thrust bearing 14 which is attached to any substantial base 15 by a plurality of attaching means 16. Around said shaft 13 I provide a bearing 17 which is attached to said flange 12 by a plurality of means 18. Around the upper portion of said shaft 13 and rigidly positioned thereon within and above said neck 7 I provide a spiral conveyor 19. Said conveyor 19 is of the correct size of radius to practically close said neck 7, but not to touch the sides thereof. Securely attached to said shaft 13 at a point within said drum 1 I provide a plurality of agitating paddles 20.

For the purpose of driving said shaft 13, I provide ring gear 23 which is rigidly positoned upon said shaft 13 at a point beneath said bottom 3 of said drum 1. Meshing with said ring gear 23 is pinion 24 upon drive shaft 25, said drive 25 to be connected to a seat of power, not shown, by any usual means. Said drive shaft 25 has a bearing 26 and a supporting member 27 which houses another bearing, not shown. Said member 27 is rigidly attached to said base 15 by attaching means 28.

In operation, the power is applied to revolve said shaft 25 which through the agency of said pinion 24 and said ring gear 23 revolves said shaft 13. Said conveyor 19 feeds dry cement from said bin 6 into said drum 1. Water is provided by said pipe 9 and the water and the dry cement are agitated and mixed by said paddles 20. The water entering by said perforations 9ª strikes directly upon the top of the revolving mass.

When said cement and water are mixed the speed with which said paddles 20 are revolving causes the whole mixture to revolve rapidly within said drum 1. The centrifugal force of the revolving liquid causes it to rise higher around the sides of said drum 1 and to be lower in the center as shown by lines 29 and 30. This forces the part of the mixture which is most thoroughly mixed to the top and out of said drum 1 through said discharge pipe 21 and into said cement pan 22. The mixed cement is then taken from said pan 22 by a cement line shown as 31.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as herein described as fairly fall within the scope of my invention.

Having thus described my invention what is claimed and desired to be secured by Letters Patent, is:

1. A device, as and for the purposes described, embodying, a cement mixer having a funnel shaped bin disposed upon its top, a vertical shaft extending through said mixer and through the neck of said bin, means for rotating said shaft, means within said neck and upon said shaft for automatically controlling the feed of dry cement into said mixer from said bin, means for projecting water into said mixer, means for agitating and mixing said water and said cement and centrifugally forcing the mixture from said mixer through an overflow pipe to a cement pan.

2. A mixer as described for mixing dry cement and water, embodying, a cylindrical drum having a funnel shaped bin disposed upon its top for holding said dry cement, means for projecting water into said drum, a vertical shaft through said drum adapted to be driven by gears, means upon said shaft for automatically controlling the feed of said dry cement into said drum, means upon said shaft within said drum for mixing said cement and water and for centrifugally forcing the mixture thereof from said drum through an overflow pipe to a cement pan.

3. A mixer as described for mixing dry cement and water, embodying, a cylindrical drum having a funnel shaped bin disposed upon its top for holding said dry cement, a screen extending in a horizontal manner across the upper portion of said bin for screening said cement, means for projecting water into said drum, a vertical shaft through said drum adapted to be driven by gears, means upon said shaft for automatically controlling the feed of said dry cement into said drum, means upon said shaft within said drum for mixing said cement and water and for centrifugally forcing the mixture thereof, from said drum through an overflow pipe to a cement pan.

4. A device, as described, embodying a cylindrical metal drum having flat ends, a funnel shaped bin mounted upon the upper end of said drum with its neck protruding through said upper end adjacent its center, a screen across the upper portion of said bin for screening dry cement, a vertical shaft extending through the bottom of said drum and upward through the neck of said bin, gear means for rotating said shaft, a spiral conveyor upon said shaft and within and adjacent to said neck for automatically controlling the feeding of said dry cement into said drum, a water pipe entering one side of said drum adjacent its top for admitting water to said drum, an over-flow pipe through the upper portion of one side of said drum leading to a cement pan, a plurality of agitating paddles upon said shaft and within said drum for agitating and mixing said cement and said water and for centrifugally forcing the mixture from said drum through said over-flow pipe leading to said pan, all substantially as and for the purposes stated.

5. A device, as described, in combination, a cylindrical metal drum having flat ends, a funnel shaped bin mounted upon the upper end of said drum with its neck protruding through said upper end adjacent its center, a screen across the upper portion of said bin for screening dry cement, a vertical shaft extending through the bottom of said drum and upward through the neck of said bin, gear means for rotating said shaft, a spiral conveyor upon said shaft and within and adjacent to said neck for automatically controlling the feeding of said dry cement into said drum, a water pipe entering one side of said drum adjacent its top for admitting water to said drum, an over-flow pipe through the upper portion of one side of said drum leading to a cement pan, a plurality of agitating paddles upon said shaft and within said drum for agitating and mixing said cement and said water and for centrifugally forcing the mixture from said drum through said over-flow pipe leading to a desired receptacle, all substantially as and for the purposes stated.

6. In a device as described the combination with a hollow metal mixing drum having a funnel shaped bin disposed upon its top and a water pipe entering said drum adjacent the top of its side, of a vertical shaft extending through said drum and through and above the neck of said bin, and adapted to be rotated by gears, a spiral conveyor within said neck and upon said shaft for automatically controlling the feed of dry cement from said bin into said drum, a plurality of paddles upon said shaft for mixing said water and said cement and for centrifugally forcing the mixture thereof out of said drum through an over-flow pipe to a cement pan.

7. In a device as described, the combination with a hollow metal mixing drum having a funnel shaped bin disposed upon its top for containing dry cement and a water pipe entering said drum adjacent the top of its side, and having a vertical shaft extending through said drum and through and above the neck of said bin, said shaft adapted to be rotated by gears, said shaft having agitating paddles thereon and within said drum for mixing said dry cement and said water and for centrifugally forcing the mixture thereof from said drum through an overflow pipe to a cement pan, of a spiral conveyor disposed upon the upper portion of said shaft within and extending above said neck for automatically controlling the feed of said bin into said drum.

JOHN E. TROUTH.